United States Patent
Odai

[11] Patent Number: 5,383,813
[45] Date of Patent: Jan. 24, 1995

[54] OIL-OPERATED TENSIONER FOR TOOTHED BELT

[75] Inventor: Nobuhiro Odai, Sakado, Japan

[73] Assignee: Tsubakimoto Chain Co., Osaka, Japan

[21] Appl. No.: 258,099

[22] Filed: Jun. 10, 1994

[30] Foreign Application Priority Data

Jun. 29, 1993 [JP] Japan .................. 5-040305[U]

[51] Int. Cl.6 .................................. F16H 7/08
[52] U.S. Cl. ........................ 474/110; 474/138
[58] Field of Search ............... 474/101, 109–111, 474/113–117, 133–138

[56] References Cited

U.S. PATENT DOCUMENTS

| | | |
|---|---|---|
| 4,504,251 | 3/1985 | Mittermeier . |
| 4,507,103 | 3/1985 | Mittermeir . |
| 4,708,696 | 11/1987 | Kimura et al. . |
| 4,713,044 | 12/1987 | Nakamura et al. . |
| 4,790,796 | 12/1988 | Okabe et al. . |
| 4,798,563 | 1/1989 | Okabe et al. . |
| 4,874,352 | 10/1989 | Suzuki . |
| 4,881,927 | 11/1989 | Suzuki . |
| 4,904,230 | 2/1990 | Kawashima et al. . |
| 4,909,777 | 3/1990 | Inoue et al. . |
| 4,911,679 | 3/1990 | Inoue et al. ............... 474/110 |
| 4,950,209 | 8/1990 | Kawashima et al. . |
| 4,997,410 | 3/1991 | Polster et al. . |
| 5,073,149 | 12/1991 | Maruyama et al. ........... 474/110 X |
| 5,073,150 | 12/1991 | Shimaya . |
| 5,087,225 | 2/1992 | Futami et al. . |
| 5,090,946 | 2/1992 | Futami et al. . |
| 5,167,402 | 12/1992 | Nakakubo et al. . |
| 5,234,383 | 8/1993 | Harada et al. ............... 474/110 |
| 5,248,282 | 9/1993 | Suzuki . |
| 5,310,385 | 5/1994 | Suzuki . |
| 5,314,388 | 5/1994 | Suzuki et al. . |

Primary Examiner—Michael Powell Buiz
Attorney, Agent, or Firm—Howson & Howson

[57] ABSTRACT

An oil-operated tensioner is constructed with an internal cylinder which receives a rod in such a way that the rod itself serves as a piston, and the diameter of the high pressure chamber formed by the rod and the cylinder is the same as that of the rod. This configuration eliminates changes in the volume of the low pressure oil chamber of the tensioner, maintains substantially constant oil pressure in the low pressure chamber, and substantially reduces the tendency of air to be drawn into the low pressure chamber as a result of flow of oil out of the low pressure chamber when the rod moves in the protruding direction. A piston on the rod in the low pressure chamber, but spaced from the wall of the chamber by a gap, exerts a positive pressure on the oil as the rod moves in the protruding direction to provide further assurance against the entry of air. A valve incorporated into the piston closes as the rod advances and opens when the rod retracts, thereby preventing the piston from causing a negative oil pressure and drawing air past the seal into the low pressure oil chamber.

3 Claims, 4 Drawing Sheets

OIL-OPERATED TENSIONER FOR TOOTHED BELT

BRIEF SUMMARY OF THE INVENTION

This invention relates to tensioners, and more particularly to improvements in oil-operated tensioners for maintaining tension in toothed belts.

A typical oil-operated tensioner comprises a cylinder having a piston dividing the interior of the cylinder into a high pressure chamber and a low pressure chamber. A piston rod extends from the piston, through the low pressure chamber, to the exterior of the cylinder, and a check valve allows relatively unrestricted flow of oil from the low pressure chamber to the high pressure chamber to the high pressure chamber, but prevents rapid flow of oil in the opposite direction. An oil reservoir, connected the low pressure chamber, is provided on the side of the cylinder, thereby causing the overall size of the tensioner to be large. The response of the tensioner when slack occurs in the belt is deficient. The delay in the flow of oil from the reservoir, through the low pressure chamber and the check valve, into the high pressure chamber allows the piston to move to and fro, and makes it possible for inadequate tensioning to be achieved and for noise to be produced.

The presence of the piston rod in the low pressure chamber causes the volume of the low pressure chamber to change at a rate different from the rate at which the volume of the high pressure chamber changes. As a result, when the piston moves in the protruding direction, flow of oil from the low pressure chamber into the high pressure chamber tends to cause a negative pressure (that is a negative gauge pressure) to exist in the low pressure chamber. This negative pressure tends to draw air into the low pressure chamber, where it may become mixed with the oil and cause maloperation of the tensioner as a result of its compressibility.

The principal object of this invention is to provide an improved oil-operated tensioner which overcomes one or more of the aforementioned difficulties encountered in the prior art. An important object is to provide improved response to slackening of the belt by providing for rapid flow of oil into a high pressure chamber of the tensioner. Still another object is to eliminate vibration and noise by preventing penetration of air into the low pressure chamber of the tensioner. Still another object is to provide a tensioner with an improved configuration allowing more versatility in the manner in which it can be attached to an engine. Still another object is to simplify the formation of an oil reservoir in a tensioner. Other objects include the reduction of the weight of the tensioner and the reduction of its manufacturing costs.

Briefly, the foregoing objects are accomplished by providing a tensioner with an internal cylinder which receives a rod in such a way that the rod itself serves as the piston and the diameter of the high pressure chamber formed by the rod and the cylinder is the same as that of the rod. This configuration eliminates the volume change in the low pressure oil chamber of the tensioner, maintains substantially constant oil pressure in the low pressure chamber, and substantially reduces the tendency of air to be drawn into the low pressure chamber as a result of flow of oil out of the low pressure chamber when the rod moves in the protruding direction.

Preferably, a piston is provided on the rod in the low pressure chamber. There is a gap between the piston and the wall of the low pressure chamber, but the piston exerts a positive pressure on the oil in the low pressure chamber between the piston and the seal through which the rod extends as the rod moves in the protruding direction. This positive pressure provides further assurance against the entry of air.

The piston is also preferably provided with a valve which closes as the rod advances and opens when the rod retracts. The valve allows the piston to apply positive pressure to the seal as the rod advances, and prevents the piston from causing a negative oil pressure at the vicinity of the seal as the piston retracts, thereby preventing air from being drawn past the seal into the low pressure oil chamber.

The oil reservoir is formed at the high pressure end of the tensioner housing and is in direct communication with the high pressure chamber. This provides for rapid flow of oil into the high pressure chamber, allows for a more compact overall configuration, and simplifies manufacture of the tensioner.

More particularly, the oil-operated tensioner in accordance with the invention comprises a hollow housing having a wall and a housing opening. A hollow cylinder is disposed within the housing, The cylinder has first and second ends, a cylindrical interior side wall, a cylinder opening at the first end, and an end wall at the second end. A first oil path is provided for the flow of oil through the end wall into the cylinder. A rod extends from the exterior of the housing into the cylinder through the housing opening and the cylinder opening. The rod is slidable in the cylinder and fits the cylindrical interior side wall with a small clearance whereby the cylinder and the rod form a high pressure oil chamber defined by the end wall of the cylinder, the rod, and a portion of the interior side wall of the cylinder. A spring urges the rod in a direction to protrude from the housing through the housing opening. Volume change absorbing means, preferably in the form of a diaphragm, is located adjacent to the second end of the cylinder. An oil reservoir is also provided within the housing adjacent to the end wall of the cylinder. The oil reservoir is defined by a portion of the wall of the housing, a portion of the cylinder, and the volume change absorbing means. The oil reservoir is in communication with the first oil path. A check valve in the first oil path allows oil to flow from the reservoir into the high pressure oil chamber, but prevents flow of oil through the first oil path from the high pressure oil chamber to the reservoir. Sealing means, located adjacent to the housing opening, surround the rod and extend from the rod to the wall of the housing. A low pressure chamber located adjacent to the cylinder opening is being defined by a portion of the wall of the housing, a portion of the rod, a portion of the cylinder, and the sealing means. A second oil path, between the housing and the cylinder, provides communication between the low pressure chamber and the oil reservoir. In a preferred embodiment of the invention, a piston is secured to the rod, the piston being out of contact with the housing. In a still further improved version, the piston includes valve means which closes when the rod moves in the protruding direction to protrude from the housing and opens when the rod retracts.

Further objects, advantages and details of the invention will be apparent from the following detailed description, when read in conjunction with the drawings.

DETAILED DESCRIPTION

Figure 6:
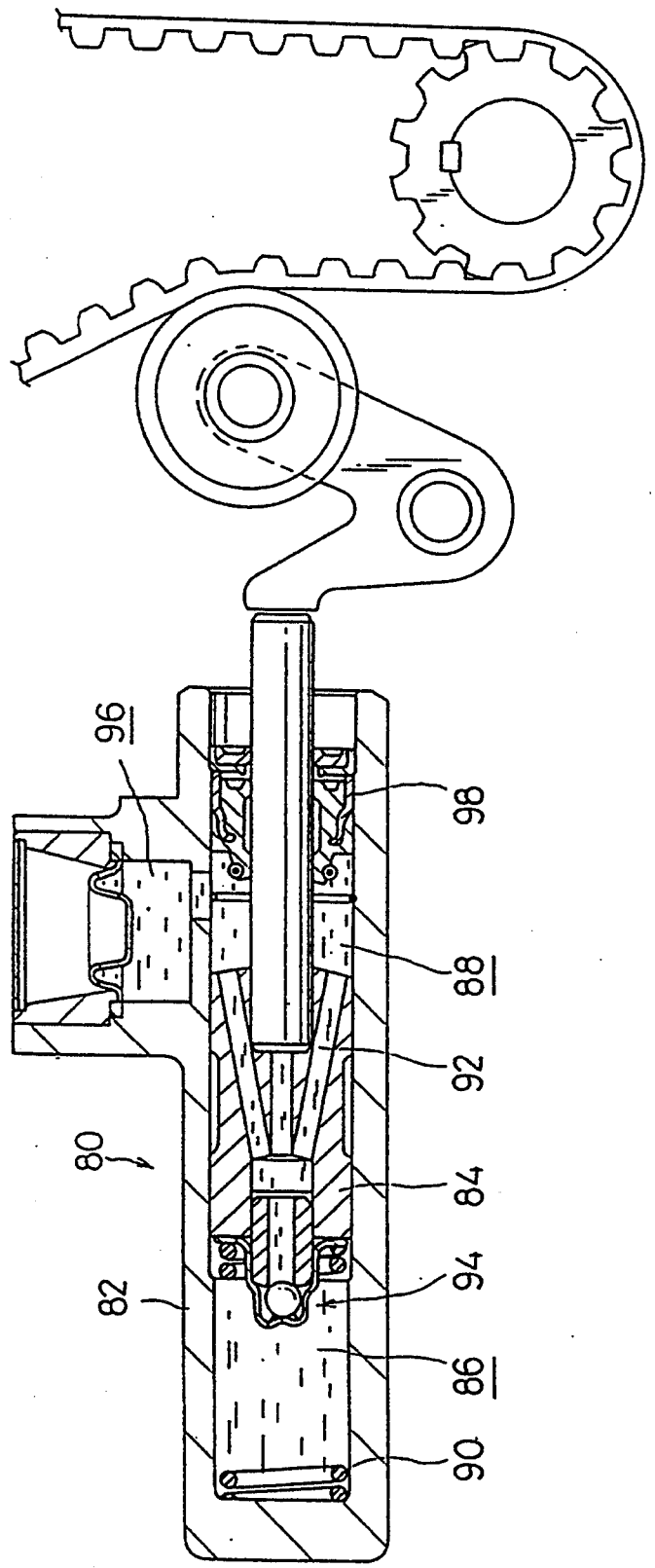
FIG. 6 is a longitudinal section showing a typical tensioner in accordance with the prior art.

Referring first to FIG. 6, which depicts a typical conventional tensioner, a piston 64 is slidable in a cylinder 82, there being a small clearance between the piston and the interior wall of the cylinder. The piston divides the cylinder into a high pressure chamber 86 and a low pressure chamber 88. A piston rod extends from the piston, through an opening at one end of cylinder, to the exterior of the cylinder, where it applies tension to a toothed belt through a pivoted roller. A spring 90, located inside the high pressure chamber 86, urges the piston 84 in a direction such that its piston rod protrudes farther from the cylinder, through a seal 98.

A ball-type check valve 94 is disposed in an oil path 92 within piston 84. This check valve allows flow of oil from the low pressure chamber 88 into the high pressure chamber, but prevents flow of oil, through the oil path 92, from the high pressure chamber to the low pressure chamber. An oil reservoir 96, provided on the side of the cylinder, is in communication with the low pressure chamber 88. As the piston moves in the protruding direction, the volume of the high pressure chamber increases. As the volume of the high pressure chamber increases, oil in the reservoir 96 moves into the high pressure chamber 86, through the low pressure chamber 88, oil path 92 and check valve 94.

The conventional tensioner described with reference to FIG. 6 has a number of drawbacks.

In particular, since the reservoir 96 is on the exterior of the cylinder 82 and extends radially relative to the axis of movement of the piston, the tensioner 80 is inevitably large in size.

Another drawback is the deficient response of the piston 84 when the belt slackens. When the tension in the belt decreases, and the piston protrudes as a result, the oil in the reservoir 96 moves into the high pressure chamber 86 through the low pressure chamber 88, the oil path 92 and the check valve 94. Until an appropriate amount of oil has moved into the high pressure chamber 86, the piston can move to and fro. Consequently, the appropriate tension may not be imparted to the belt, and noise may be produced.

Still another drawback is that, when the piston 84 moves in the protruding direction, and until an appropriate amount of oil has moved into the high pressure chamber, the pressure within the low pressure chamber 88 may become negative. As a result, air may be drawn into the low pressure chamber 88 through the seal 98. If the air becomes mixed with the oil, its compressibility may have an adverse effect on the operation of the tensioner.

Figure 1:
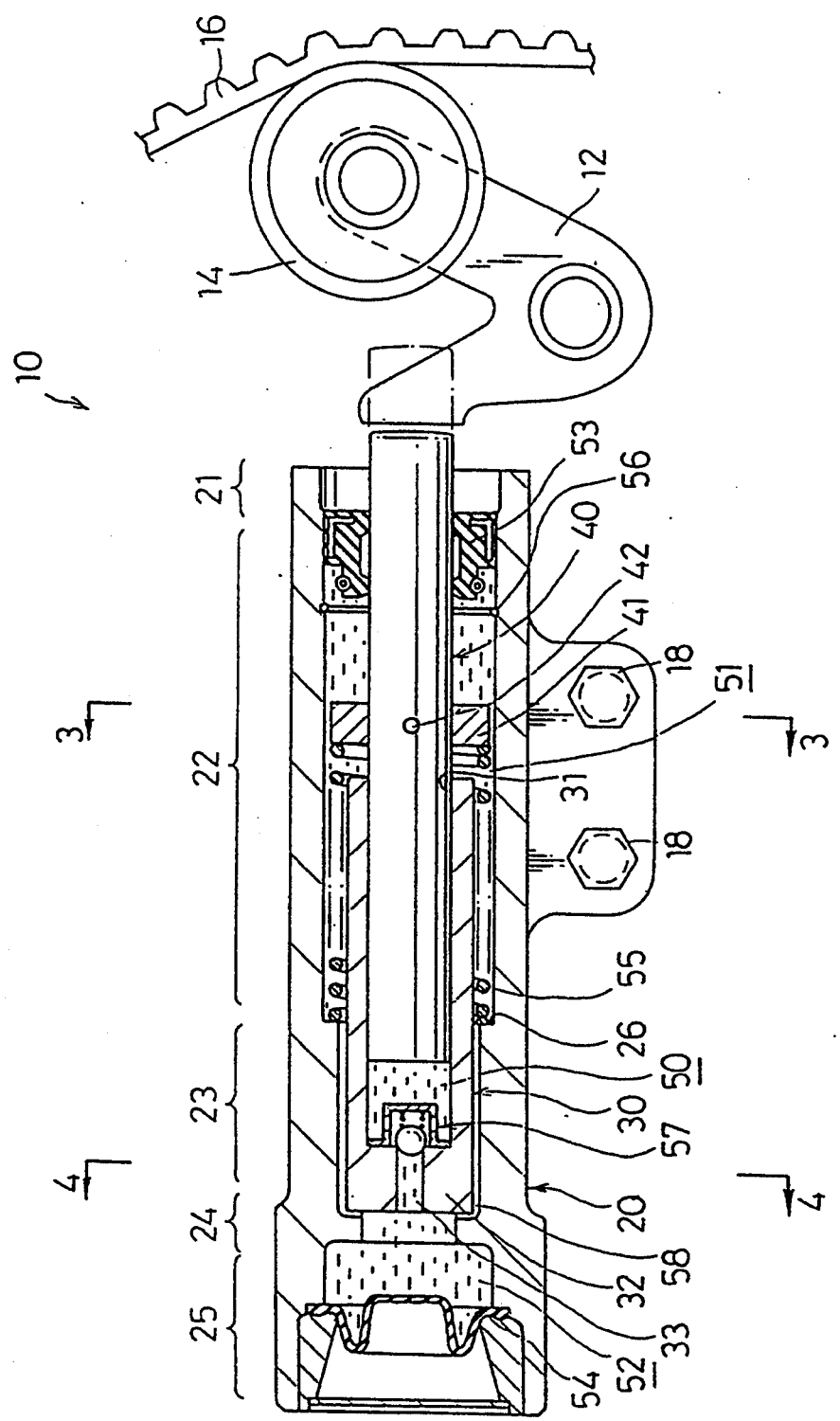
FIG. 1 is a longitudinal section of a tensioner in accordance with a first embodiment of the invention, showing a portion of a toothed belt and a lever and roller through which the tensioner applies tension to the belt.

The tensioner of the invention is not subject to these drawbacks. Referring to FIG. 1, tensioner 10 comprises a hollow housing 20, which is preferably an aluminum die casting. A cylinder 30 is located within the interior of the housing, and a rod 40, which is slidable in the cylinder, extends to the exterior of the housing to engage a lever arm 12, which carries an idler roller bearing against toothed belt 16. Housing 20 is typically fixed to an engine block (not shown) by bolts 18.

Figure 2:
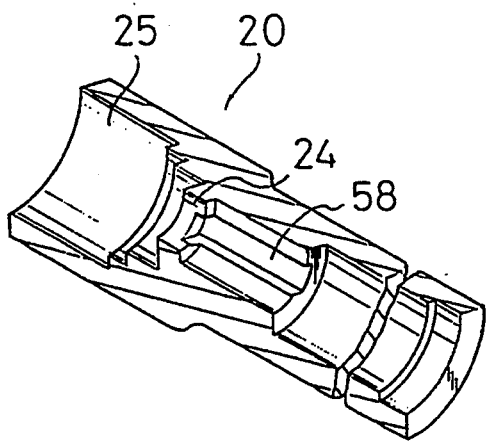
FIG. 2 is a partially cut away perspective view of the housing of the tensioner of FIG. 1.
Figure 3:
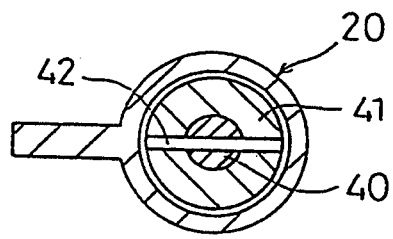
FIG. 3 is a radial section taken on plane 3—3 of FIG. 1.

FIG. 2 shows the housing in greater detail. Referring to FIGS. 1 and 2 together, it will be seen that the housing comprises three coaxial cylindrical parts 21, 22 and 23, an external step 24, and a reservoir 25. The internal diameter of part 22 is less than that of part 21, and the internal diameter of part 23 is less than that of part 22.

Cylinder 30 is hollow, having an opening 31 at one end. An end wall 32 is provided at the opposite end of the cylinder. This end wall has a through passage 33 forming an oil path. The cylinder is press fit into cylindrical part 23 of the housing 20. Rod 40 fits into cylinder 30 with a small clearance so that the rod and cylinder form a high pressure chamber 50, the volume of which varies as the rod slides in the cylinder.

At the end nearest lever arm 12, a low pressure chamber 51 is defined by a portion of housing 20, a portion of cylinder 30, a portion of rod 40, and the seal 53, which extends from the rod to the housing, thereby closing off the end of the housing. A piston 41 is secured to the rod by a pin 42. The piston, which is located in the low pressure chamber is of a diameter such that there is an annular gap between it and the internal wall of part 22 of the housing. Thus, there is a slight resistance to flow of oil past the piston through the annular gap. A compression spring 56 is disposed between the piston 41 and the shoulder at which cylindrical housing parts 22 and 23 meet. The spring urges rod 40 in the protruding direction. A ring 56, affixed to the internal wall of the housing, is engageable by piston 41 to limit movement of the rod 40 in the protruding direction.

At the end of the housing remote from lever arm 12, an oil reservoir 52 is formed, the reservoir being defined by the wall of the housing and a diaphragm 54, which serves as a volume change absorbing device for the reservoir. The reservoir 52 communicates with the high pressure chamber 50 through passage 33 in the end wall 32 of the cylinder 30. A check valve 57 is disposed in the oil path between the reservoir and the high pressure chamber. This check valve, which comprises a ball seated by a weak spring against the opening of passage 33 to the high pressure chamber 50, allows flow of oil through passage 33 from the reservoir into the high pressure chamber 50, but prevents flow of oil through passage 33 in the opposite direction.

Figure 4:
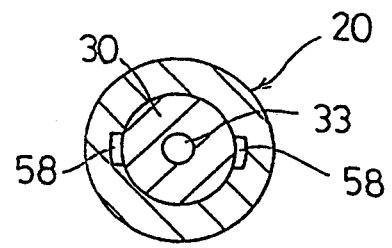
FIG. 4 is a radial section taken on plane 4—4 of FIG. 1.

As shown in FIGS. 1, 2 and 4, two axial oil paths 58 are formed in the interior wall of part 23 of the housing so that oil can flow axially past the cylinder 30 when it is press fit into the housing. Radial oil paths are also provided in the stepped portion 24 of the housing, as best seen in FIG. 2, so that oil can flow past the end wall 32 of the cylinder. These oil paths provide communication between the oil reservoir 52 and the low pressure chamber 51.

In the operation of the tensioner, when the toothed belt slackens, the rod 40 advances to restore tension in the belt. The volume of the high pressure chamber 50 increases, and oil flows quickly from the reservoir into the high pressure chamber through passage 33 and the check valve 57.

In the case of an increase in belt tension, rod 40 must retract to mitigate the tension. When this occurs, the volume of the high pressure chamber must decrease. To permit the volume of the high pressure chamber to decrease, oil flows gradually from the high pressure chamber 50 into the low pressure chamber 51 through the small clearance between the cylinder 30 and rod 40. The oil can return from the low pressure chamber to the reservoir through the oil path provided between the housing and the cylinder.

In the tensioner, the rod itself serves as the piston and the diameter of the high pressure chamber formed by the rod and the cylinder is the same as that of the rod. This configuration eliminates the volume change in the low pressure oil chamber of the tensioner as the rod moves. As the rod moves in the protruding direction, there is little if any flow of oil out of the low pressure chamber, and a substantially a substantially constant oil pressure is maintained in the low pressure chamber. Thus, there is little tendency for air to be drawn into the low pressure chamber when the rod moves in the protruding direction.

The piston provided on the rod in the low pressure chamber, with a gap between the piston and the wall of the chamber, provides additional protection against entry of air by maintaining a positive pressure in the portion of the low pressure chamber on the side of the piston facing the seal 53 as the rod moves in the protruding direction.

The oil reservoir is formed at the high pressure end of the tensioner housing and is in direct communication with the high pressure chamber. This provides for rapid flow of oil into the high pressure chamber for improved response to slackening of the toothed belt. The location of the reservoir at the end of the housing rather than at the side, and in coaxial relationship with the housing, allows for a more compact overall configuration, and simplifies manufacture of the tensioner. The tensioner configuration also provides more versatility in the ways in which the tensioner can be attached relative to an engine.

Another important advantage of the invention is that, since the housing and cylinder are separate elements, the housing can be made from an aluminum die casting, with substantial reduction in the overall weight of the tensioner, and with a remarkable reduction in manufacturing costs.

Figure 5:
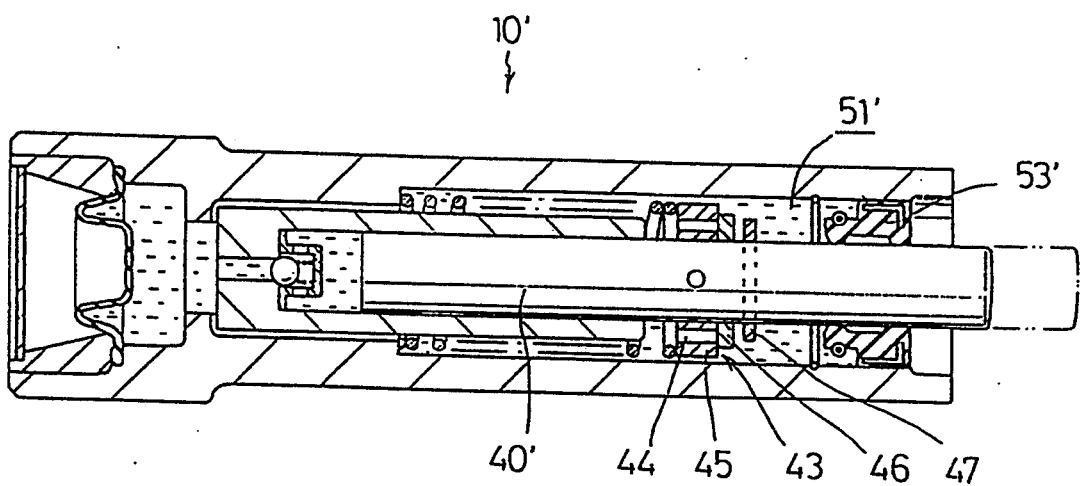
FIG. 5 is a longitudinal section of a tensioner in accordance with a second embodiment of the invention.

FIG. 5 depicts a tensioner 10' which differs from the embodiment of FIGS. 1-4 in that a valve 43 is formed by axial bores 44 in its piston 45, and a valve member 46, which is adapted to slide on rod 40' into and out of contact with the side of piston 45 which faces the seal 53'. The valve member 46 is arranged to close off axial bores 44, and a stop 47 is secured to rod 40' to limit the axial movement of valve member 46.

In the operation of the device of FIG. 5, as the rod 40' advances, valve member 46 closes off the bores 44 so that the pressure within low pressure chamber 51' on the forward side of the piston is kept positive. As rod 40' retracts, the valve member 46 opens, allowing oil to flow quickly, through bores 44, into the forward portion of the low pressure chamber. The valve 43 prevents air from being drawn into the low pressure chamber 51' by keeping the pressure on the forward side of the piston 45 positive as the piston moves in the retracting direction.

When the piston is provided with a valve, as shown in FIG. 5, which closes as the rod advances and opens when the rod retracts, still greater protection against the entry of air is achieved.

Various modifications can be made to the apparatus described above. For example, while the spring 55 in FIG. 1 is provided in the low pressure chamber between the piston 41 and a shoulder in the wall of the housing, as an alternative, a spring could be located in the high pressure chamber. Various alternative passage configurations can be utilized for oil communication between the reservoir and the low pressure chamber. These and many other modifications can be made to the apparatus described without departing from the scope of the invention as defined in the following claims.

I claim:

1. An oil-operated tensioner for a toothed belt comprising:
   a hollow housing having a wall and a housing opening;
   a hollow cylinder disposed within the housing, the cylinder having first and second ends, a cylindrical interior side wall, a cylinder opening at said first end, and an end wall at said second end, the end wall having means providing a first oil path for the flow of oil through the end wall into the cylinder;
   a rod extending from the exterior of the housing into the cylinder through the housing opening and the cylinder opening, the rod being slidable in the cylinder and fitting the cylindrical interior side wall with a small clearance whereby the cylinder and the rod form a high pressure oil chamber defined by the end wall of the cylinder, the rod, and a portion of the interior side wall of the cylinder;
   spring means for urging said rod in a direction to protrude from the housing through the housing opening;
   volume change absorbing means located adjacent to said second end of the cylinder;
   an oil reservoir within the housing adjacent to the end wall of the cylinder, the oil reservoir being defined by a portion of the wall of the housing, a portion of the cylinder, and said volume change absorbing means, the oil reservoir being in communication with said first oil path;
   means, comprising a check valve in said first oil path, for allowing oil to flow from the reservoir into the high pressure oil chamber, but preventing flow of oil through said first oil path from the high pressure oil chamber to the reservoir;
   sealing means located adjacent to the housing opening, the sealing means surrounding the rod and extending from the rod to the wall of the housing;
   a low pressure chamber located adjacent to the cylinder opening and being defined by a portion of the wall of the housing, a portion of the rod, a portion of the cylinder, and the sealing means; and
   means providing a second oil path between the housing and the cylinder, for providing communication between said low pressure chamber and said oil reservoir.

2. An oil-operated tensioner according to claim 1 further comprising a piston secured to the rod, the piston being out of contact with the housing.

3. An oil-operated tensioner according to claim 2 in which the piston includes valve means which closes when the rod moves in the direction to protrude from the housing and opens when the rod moves in the opposite direction.

* * * * *